Patented Dec. 22, 1931

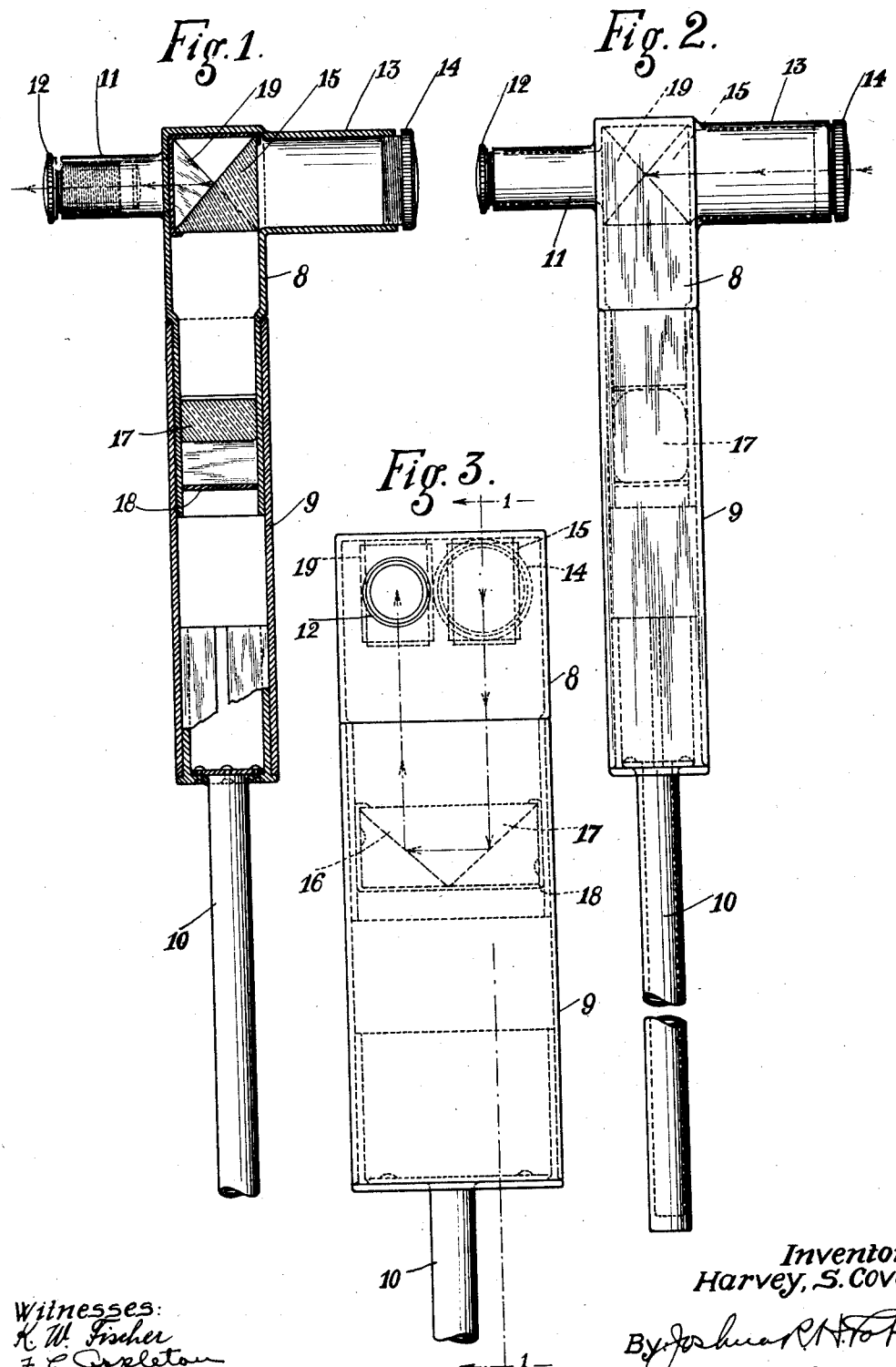

1,837,207

UNITED STATES PATENT OFFICE

HARVEY S. COVER, OF SOUTH BEND, INDIANA

MONOCULAR OPTICAL INSTRUMENT

Application filed August 22, 1928. Serial No. 301,219.

This invention relates to a monocular optical instrument and pertains more particularly to an optical instrument of this type employing a system of reflecting prisms whereby a telescopic effect is produced in a device of compact size and convenient form.

An object of the invention is the provision of an instrument having ocular and objective tubes provided with magnifying lenses and an intermediate telescopic tube containing a plurality of reflecting prisms whereby the light is reflected from the plane of the objective lens to a remote point and thence back to the plane of the ocular lens by means of a total reflecting prism.

An additional object is the adaptation of the instrument to a walking stick or the like whereby the device is inconspicuous and not likely to arouse alarm or suspicion on the part of animals or human beings desired to be observed.

Other objects will appear hereinafter.

The invention consists in the combinations and arrangements of parts hereinafter described and claimed.

The invention will be best understood by reference to the accompanying drawings forming a part of this specification and in which:

Fig. 1 is a vertical sectional view of an instrument of the invention, taken on the line 1—1 of Fig. 3;

Fig. 2 is a side elevational view of the instrument;

Fig. 3 is a front elevational view.

As illustrated in the drawings, the preferred embodiment comprises a main rectangular tubular portion 8 which is adapted to support the reflecting prisms and may be arranged to slidably and frictionally engage a similar rectangular body 9 mounted upon the upper end of a rod 10 whereby the device may be used as a walking stick or the like. By this arrangement the instrument may be detached for convenient use or transportation or may be incorporated as shown in a walking stick or umbrella. Upon one side of the rectangular body 8 is mounted an ocular tube 11 within which may be screw threaded ocular lens 12 of any desired magnifying power. On the opposite side of the member 8 but not in alignment with tube 11 is mounted objective tube 13 within which is screw threaded an objective lens 14 of any desired magnifying power. Disposed within the member 8 in alignment with objective tube 13 is a single reflecting prism 15 adapted to reflect the rays of light passing through tube 13 at right angles in a downward direction. Disposed at any desired point in the member 8 remote from the tubes 11 and 13 is a total reflecting prism 16, 17, mounted in a suitable bracket 18 as shown in Fig. 3, and adapted to receive and reflect the rays of light from prism 15 in the direction shown in Fig. 3 upwardly to a second single reflecting prism 19 positioned in alignment with ocular tube 11 and lens 12.

For the reason that the prismatic system employed presents the image after reflection by prism 19 in an inverted position, for terrestrial observation, the lens 12 may be of the negative Huygens type to reverse the image to upright position. Also, the body portion of lens 12 may have sliding engagement within tube 11 for the purpose of increasing or decreasing the focal length, but in the preferred embodiment a screw threaded engagement is employed. Further, the focal length may be increased to any desired extent by increasing the length of member 8 and disposing the total reflecting prism 16, 17, a greater distance from the ocular and objective tubes. It will be noted that the support or attachment 10 is not essential to the device, but has been found of advantage in offering a convenient means for carrying the instrument and for supporting the instrument when in use. As an additional feature, the instrument may be held sideways so that the central rectangular tube 8 will effectively act as a shield for the unused eye, and it is likewise apparent that the instrument may be held with one hand or both hands in any desired vertical or horizontal position or at any angle, thus materially adding to its adaptability and range of usefulness. In the form shown, the arrangement of the tubes 11 and 13 is such that they may be readily grasped by the hand when the device is incorporated in a walking stick, umbrella or the like.

While I have described and illustrated the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claim.

Having thus described my invention, what I claim as new and desire to secure by Letters Patent is:

A monocular optical instrument, comprising a main tubular member, an objective tube extending laterally from said main tubular member, an objective lens mounted in said objective tube, an ocular tube extending laterally from said main tubular member upon the opposite side from said objective tube, an ocular lens mounted in said ocular tube, an objective reflecting prism, an ocular reflecting prism, a total reflecting prism adapted to receive and reflect rays of light between said objective and ocular prisms, said objective and ocular tubes being of sufficient length to provide gripping handle portions, and means for securing said main tubular member to a supporting rod.

In testimony whereof I have signed my name to this specification.

HARVEY S. COVER.